June 27, 1950     C. J. HELMERS ET AL     2,513,022
MANUFACTURE OF HYDROGEN
Filed Oct. 5, 1944
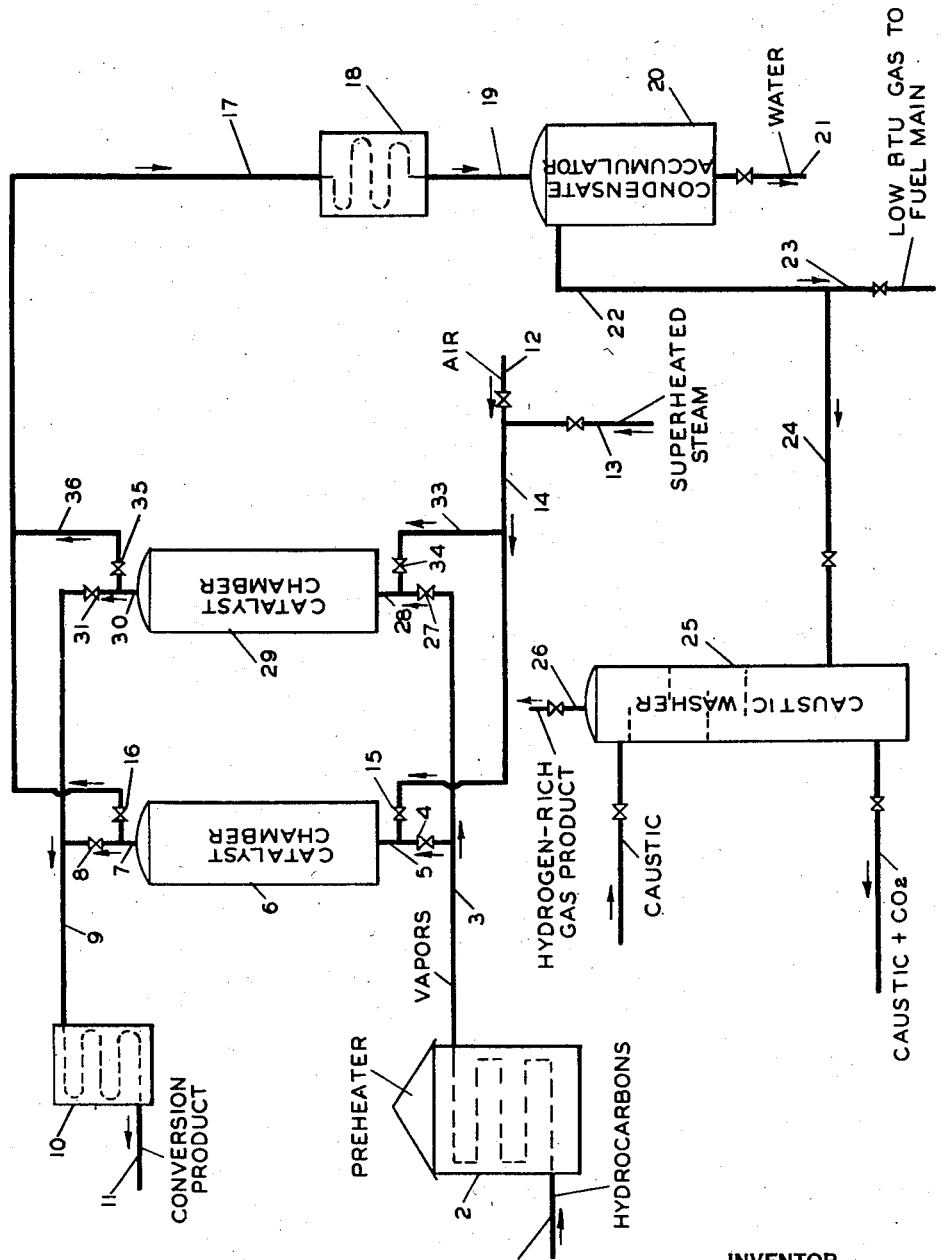
INVENTOR
C. J. HELMERS
P. H. JOHNSON
BY Hudson & Young
ATTORNEYS Patented June 27, 1950

2,513,022

UNITED STATES PATENT OFFICE 2,513,022

MANUFACTURE OF HYDROGEN

Carl J. Helmers and Paul H. Johnson, Bartlesville, Okla., assignors to Phillips Petroleum Company, a corporation of Delaware Application October 5, 1944, Serial No. 557,353

16 Claims. (Cl. 196—52)

This invention relates to the production of a hydrogen-rich gas. More specifically, the present invention is concerned with the production of hydrogen by a catalytic cycle process in which the same catalyst is alternately utilized in carbonizing hydrocarbons and in promoting the interaction of the carbon deposit with steam-air mixtures to produce hydrogen. Still more specifically, this invention relates to the production of a gas with a high hydrogen and carbon dioxide content and a low carbon monoxide content. The present invention also relates to the application of specific catalyst compositions effective in the production of hydrogen and carbon dioxide.

The hydrogen requirements of modern chemical technology are such that its manufacture has become an important large-scale industry. Specific examples of processes using large quantities of hydrogen include: hydrogenation of fat, synthesis of ammonia and methanol, manufacture of tungsten, and hydrogenation of codimer in the petroleum industry. Because of the physical characteristics of hydrogen, large-scale consumers are necessarily faced with the problem of manufacturing hydrogen at the site of its use. Therefore, it follows that in spite of the number of available processes, no single process may be considered to be universally applicable. Since the most abundant source of hydrogen is water, virtually all successful hydrogen processes are concerned with the decomposition of steam by means of some variation of the well-known water-gas reaction. Water-gas, as such, is rarely satisfactory for direct application in processes requiring hydrogen because of its carbon monoxide content. At the present time, the most economical source of industrial hydrogen is said to be a process involving treatment of water gas with steam over an iron oxide catalyst promoted with chromium and thorium. This process is purported to effect conversion of carbon monoxide to the dioxide which may be conveniently removed while the hydrogen content is further increased by a molecular amount equivalent to the original carbon monoxide content. It is obvious that in addition to the catalytic equipment involved in this process, a complete gas set for the manufacture of water-gas is required. A hydrogen-producing process eliminating this auxiliary equipment would be obviously advantageous and in non-coal producing localities any process involving the use of coal or coke presents a serious economic problem of supply.

It is, therefore, an object of this invention to provide a process for the manufacture of hydrogen utilizing hydrocarbon fluids and water as raw materials.

Another object of this invention is to provide a catalytic process for the manufacture of hydrogen wherein the same catalyst is employed alternately to promote the carbonization of hydrocarbon fractions and the interaction of the resulting carbon with steam-air mixtures to produce a gas rich in hydrogen.

It is also an object of this invention to provide a process for the manufacture of hydrogen capable of combining with a process for conversion of hydrocarbons in which the carbonization of hydrocarbons in said process for the manufacture of hydrogen corresponds to the conversion of hydrocarbons in said conversion process, and the interaction of carbon with steam-air mixture to produce hydrogen in the former corresponds to the regeneration of the catalyst in the latter process.

Still another object is to provide a process for the production of hydrogen-rich gas with a sufficiently low carbon monoxide content to eliminate the necessity of further purification.

Another object is to provide a process for the manufacture of a hydrogen-rich gas in which the composition of the gas product is effectively controlled by temperature regulation.

A still further object is to provide selective catalysts comprising synthetic alumina impregnated with minor proportions of alkali and alkaline earth oxides to promote all primary reactions of the present process.

Additional objects and advantages of the present invention will be apparent from the subsequent disclosure.

We have found that whereas many natural and synthetic catalysts are capable of accelerating the carbonization of hydrocarbon vapors, relatively few compositions have any beneficial effect on the carbon-steam reaction. Thus, while catalysts consisting essentially of alumina are highly efficient in promoting the decomposition of hydrocarbons, the course of the steam decomposition reaction appears to be non-selective as exemplified by the formation of excessive quantities of carbon monoxide and carbon dioxide along with the hydrogen. However, we have further found that alumina impregnated with alkali and alkaline earth oxides retains its activity toward the hydrocarbon decomposition reaction and under the proper conditions also exerts a favorable effect on the hydrogen-producing phase of the process as reflected in a gas of increased hydrogen content containing virtually no carbon monoxide.

In its broader aspects, the present invention involves a cyclic operation in which the first step comprises the deposition of carbon on the catalyst and the second step provides for the catalytic interaction of carbon with steam and air to evolve the product gas and to complete the cycle by preparing the catalyst for further hydrocarbon carbonization. When the preferred catalysts of this invention are employed, carbonization may be effected by passing hydrocarbon vapors suitably preheated to from about 900° F. to 1500° F. over the catalyst at a rate of about 1 to 5 volumes of liquid feed per volume of catalyst per hour. The carbonization step of the cycle is ordinarily completed when carbon deposition has reached a suitable value preferably within the range of about 0.05 to about 0.3 pound of carbon per pound of catalyst. The unconverted hydrocarbon and conversion products may be recycled after removal of fixed gases or the total effluent may be passed through a condenser and processed for recovery of valuable by-products prior to the preparation of a recycle stock. Ordinarily the processed gases are employed as fuel for the preheaters and steam generation equipment, thereby enhancing the economic value of the present process. When the requisite amount of carbon has been deposited on the catalyst, the flow of hydrocarbon vapors to the catalyst case is discontinued and a preheated mixture of steam and air is admitted to initiate the generation of hydrogen. Since the reactions involved in the interaction of carbon and steam are endothermic, sufficient air is introduced to maintain a conversion temperature from 1000° F. to 1500° F. in the catalyst zone by combustion of carbon. Since air introduces nitrogen as a diluent in the effluent hydrogen stream, it is desirable to employ the minimum quantity of air necessary to counteract heat losses. Thus, the quantity of air admixed with the steam is usually adjusted to give from 1.5 to about 5 cubic feet of air per pound of steam with values of 1.5 to 3.0 cubic feet of air being preferred. To assure an excess of steam during the reaction 15 to 30 pounds of steam per pound of carbon converted is used. The effluent gas consisting of steam, hydrogen, carbon dioxide, nitrogen and negligible quantities of carbon monoxide is cooled to condense the steam and then washed to remove carbon dioxide. Although under conditions of partial combustion, increased formation of carbon monoxide might be expected, applicants have discovered that by proper correlation of conditions its formation may be minimized. Thus, applicants are enabled to operate their endothermic process without the necessity for supplying external heat while at the same time avoiding the formation of undesirable and difficultly separable proportions of carbon monoxide.

The advantages of the present process are emphasized when the reactions and the compositions of the gaseous products are compared with non-catalytic processes for the manufacture of hydrogen. Formation of carbon monoxide by the interaction of water and carbon is common in most hydrogen producing processes. Thus, in the hydrogen producing step of the present invention, this typical reaction might be expected. In the subjoined tabulation typical gas analyses of non-catalytic processes are presented along with an analysis of the effluent gas from the present process.

| Components | Producer Gas | Water Gas | Gas from Present Process |
|---|---|---|---|
| | Volume Per Cent | Volume Per Cent | Volume Per Cent |
| $H_2$ | 13.2 | 50.8 | 60.2 |
| CO | 25.3 | 40.9 | 2.5 |
| $CO_2$ | 5.4 | 3.4 | 28.9 |
| $O_2$ | 0.6 | 0.5 | 0.0 |
| $N_2$ | 55.2 | 3.9 | 8.4 |
| $CH_4$ | 0.4 | 0.2 | 0.0 |

Since in the catalytic process of this invention approximately 2 mols of hydrogen are formed per mol of carbon dioxide, the net effect amounts to the selective catalysis of the reaction, $$C+2H_2O=2H_2+CO_2$$

to the virtual exclusion of the conventional reaction for blue-gas formation, $C+H_2O=H_2+CO$. After removal of carbon dioxide from the product gas, the only significant remaining contaminant is nitrogen. However, in the majority of processes utilizing industrial hydrogen, the nitrogen content may be considered merely as an inert diluent. Under the conditions described herein hydrogen mixtures containing less than about 5% CO are readily obtained while the formation ratio of $CO_2$ to CO may be maintained in the proportion of 10 to 1 or better.

The invention will be more particularly described in connection with the accompanying drawing which shows one form of apparatus for carrying out the process, but it is to be understood that the said drawing is illustrative only and the invention is not to be limited thereto.

The drawing represents schematically one type of apparatus in which the present process may be used. A petroleum distillate such as gas-oil from line 1, previously vaporized by any of the conventional methods known to the art, is charged to the preheater 2 where it is heated to the desired treating temperature. From the heater the vapors pass via line 3, valve 4 and line 5 to the catalyst chamber 6 where hydrocarbon decomposition is effected and carbon is deposited on the catalyst. The mixture of unchanged oil and conversion material then passes through line 7, valve 8 and line 9 to condenser 10. Gaseous products are separated (in a manner not shown) from the normally liquid hydrocarbons by any suitable method known to the art and the liquid products are then withdrawn via line 11 or recycled to the oil stream as desired. The liquid hydrocarbons may be processed further to become a valuable product.

In the second step of the cycle, valve 4 is closed in order to stop the flow of hydrocarbon vapors to catalyst chamber 6. A mixture of air and steam, from lines 12 and 13 respectively, heated to a suitable temperature, passes through line 14, valve 15 and line 5 to the catalyst chamber 6 where the catalytic interaction of steam and carbon takes place to produce the hydrogen-rich gas. At the conclusion of this step the catalyst is ready for a new cycle. The effluent gas leaves the catalyst chamber via line 7, valve 16 and line 17 and passes through cooler 18, line 19 to condensate accumulator 20 where water is removed and withdrawn as necessary via line 21. From the condensate accumulator the gas, consisting of hydrogen, carbon dioxide, nitrogen and small quantities of carbon monoxide, passes through line 22 and may be vented via line 23 to the fuel main or led through line 24 and caustic washer 25 where carbon dioxide is removed. The hydrogen-rich gas is withdrawn to storage via line 26.

A satisfactory method of operating the process is shown in the drawing whereby two catalyst chambers are provided in order that the two steps of the process may be carried out simultaneously in the respective catalyst chambers. However, the number of chambers is dependent upon the size of the unit and the volume of gas desired. In actual operation the carbonization and hydrogen forming steps are carried out simultaneously in such a way that carbon is being deposited in one catalyst chamber while hydrogen and carbon dioxide are being evolved from the other. For example, valves 4 and 8 are opened and 15 and 16 are closed to allow the preheated vapors to enter catalyst chamber 6 where carbon deposition occurs. At the same time valves 27 and 31 are closed and 34 and 35 are opened to allow the mixture of air and steam to enter catalyst chamber 29 through line 33, valve 34, and line 28, for the carbon-steam reaction while the hydrogen-rich gas leaves by line 30, valve 35, and line 36. This arrangement may be adapted to processes for conversion of hydrocarbons, such as cracking, polymerization, isomerization, etc., wherein carbon is deposited during the conversion step, and hydrogen is produced during the catalyst regeneration step. Many of the catalysts used in the above processes for the conversion of hydrocarbons are also effective catalyzers for formation of hydrogen and carbon dioxide in the regeneration of the catalyst with steam air mixtures. The combination of conversion and hydrogen formation in this manner assures the most economical system possible for the production of these products.

Hydrocarbons suitable for the deposition of carbon in this process may vary over a wide range as to boiling point and may include materials such as gasoline, kerosene, gas oil, heavy oils, recycle stock from cracking units and the like. The rate of coking is mainly dependent on contact time and the temperature of the catalyst bed. In general, the flow rate is maintained at about one volume of liquid feed per volume of catalyst per hour while the temperature of the feed may vary from about 900° to about 1500° F. with an intermediate range of 1100° to 1200° F. being generally preferred. Super-atmospheric pressures as low as 25 to 100 pounds per square inch gage are generally applicable.

The preferred catalysts of our process comprise alumina promoted with small quantities of magnesium, barium, potassium and other alkali or alkaline earth oxides. In the preparation of the alumina base catalysts of this invention, the added metal oxides may be provided in the form of metal salts and converted to the oxides by subsequent treatment. While the function of the individual components of the catalyst composition are not limited to any particular theories, the alumina is usually regarded as the basic component with certain of its catalytic properties modified by the added ingredients. The modification in this case is directed toward improved catalyst characteristics for the hydrogen generation step. Ordinarily the amount of any single promoter will not exceed about 5 per cent of the total catalyst weight. However, when a combination of promoters is used, as much as 15 per cent or more of the finished catalyst may be in the form of adsorbed oxides. In the hydrogen producing step of our cycle process, the temperature is controlled by the temperature of the steam-air mixture entering the catalyst chamber and by the concentration of air in the steam-air mixture. The cubic feet of air per pound of steam usually varies from about 1.5 to about 4.5 with values between 1.5 and 3.0 being preferred. The temperature of the steam-air mixture is generally maintained within the range of about 1000° to about 1100° F., while the temperature in the catalyst chamber may vary from about 1000° F. to 1500° F. with 1300° F. to about 1400° F. being most favorable to the formation of hydrogen and carbon dioxide. Operating pressures are usually held within about 25 to 100 pounds per square inch gage although somewhat higher pressures may be used. The rate of flow of the steam-air mixture determines the rate of carbon consumption and to some extent the amount of carbon monoxide formed in the second half of the cycle, hence, within the limits of 15–30 pounds of steam per pound of carbon converted, this rate is adjusted to balance the time required in the coking step in order to insure smooth operation of the unit. Depending on the demand for hydrogen, the time for a complete cycle of operations may be varied from about 3 to 20 hours.

*Example 1*

A series of runs was carried out with the object of determining optimum temperature of operation in the hydrogen-producing step of the process. The catalyst employed in this work comprised alumina impregnated with the oxides of magnesium, barium and potassium, the respective oxides being present in proportions of about 5 per cent by weight of total catalyst. The process was operated on a 6 hour cycle with 3 hours being allotted to each of the two steps. In the carbonization step a vaporized gas oil having a boiling range of 500–850° F. and a gravity of 33° API was charged to the catalyst zone at a temperature of 1000° F. and under a pressure of 25 pounds per square inch gage. A flow rate of 1 liquid volume per volume of catalyst per hour was used. During the three-hour carbonization period an average carbon deposition of 0.15 pound of carbon per pound of catalyst was realized in four separate runs. In the hydrogen-producing half of the cycle, superheated steam was charged at an average rate of 32 pounds per pound of carbon converted while the quantity of air used varied from 1.5 to 3.0 cubic feet per pound of steam. The pressure was maintained at approximately 25 pounds per square inch gage. The effluent gases were analyzed before and after the caustic scrubber. A summary of the analytical results is given in the appended tabulations.

| Catalyst-Zone Temperature, °F. (Hydrogen Generation) | Before Scrubber Composition of Effluent Gas, Vol. Per Cent | | | | | After Scrubber Per Cent $H_2$ $CO_2$-Free Gas |
|---|---|---|---|---|---|---|
| | $H_2$ | $CO_2$ | CO | $O_2$ | $N_2$ | |
| 1,005 | 18.2 | 21.4 | 2.5 | 0.4 | 57.5 | 23 |
| 1,050 | 34.6 | 23.2 | 1.0 | 0.0 | 41.2 | 45 |
| 1,270 | 44.3 | 25.6 | 1.6 | 0.0 | 28.5 | 59.5 |
| 1,320 | 60.2 | 28.9 | 2.5 | 0.0 | 8.4 | 84.5 |

The above data indicate that the most effective temperature range for maximum hydrogen production lies above 1300° F. Because of detrimental changes in catalyst structure as well as unfavorable equilibrium conditions, the upper temperature limit is fixed at about 1500 F. In the optimum temperature range the catalyst activity is such that a minimum amount of air equivalent to about 2.5 cubic feet per pound of steam is adequate for maintenance of conversion temperature thereby reducing the quantity of inert diluent included in the carbon dioxide-free gas.

*Example II*

The effectiveness of the promoters employed in our preferred catalyst composition was illustrated in test runs using a natural alumina catalyst, bauxite. Reaction conditions in both steps of the process were carried out substantially as described in Example I. In the hydrogen producing portion of the cycle an average catalyst temperature of 1350° F. was maintained in view of the excellent results previously obtained in this range with the preferred catalyst. However, due to the non-specificity of the bauxite catalyst toward the hydrogen-producing reactions, an average air consumption of 3.7 to 4.6 cubic feet of air per pound of steam was necessary in order to maintain the desired reaction temperature. The following is a comparison of the analytical results obtained on a composite effluent gas from the second step using the bauxite catalyst and using the promoted catalyst.

| Component | Bauxite Catalyst, Vol. Percent | Promoted Catalyst, Vol. Percent |
|---|---|---|
| $H_2$ | 12.5 | 60.2 |
| $CO_2$ | 15.2 | 28.9 |
| $CO$ | 13.1 | 2.5 |
| $O_2$ | 0.0 | 0.0 |
| $N_2$ | 59.2 | 8.4 |

In view of the low hydrogen content and high carbon monoxide content of the gas using the bauxite catalyst, the value of the alkali and alkaline earth oxides as promoters for alumina is amply demonstrated.

We claim:

1. The process for producing hydrogen by the conversion of hydrocarbons and steam in the presence of a catalyst favorable to carbonization in one stage and the formation of carbon dioxide and hydrogen in another stage which comprises in the first stage passing preheated hydrocarbon fluids over said catalyst under conditions of time, temperature, and pressure which effect the deposition of an amount of carbon thereon between 0.05 and 0.3 pound per pound of catalyst, and subsequently in the second stage passing steam admixed with sufficient air to maintain a reaction temperature of between 1000 and 1500° F. over said catalyst so as to form a hydrogen-carbon dioxide effluent containing less than 5 volume per cent carbon monoxide by the catalytic interaction of said carbon and steam and to prepare said catalyst for further hydrocarbon carbonization, and recovering hydrogen from the effluent.

2. An improved process for the production of hydrogen from hydrocarbons and steam by conversion in the presence of a contact material, which comprises passing hydrocarbons preheated to a temperature from 900° F. to 1500° F. through a conversion zone at a rate of about 1 to 5 volumes liquid feed per volume of contact material per hour and at a low superatmospheric pressure so that carbon is deposited thereon in an amount between 0.05 and 0.3 pound per pound of catalyst, and subsequently admixing steam with sufficient air to maintain the necessary heat of conversion, passing the mixture of steam and air through said conversion zone in the amount of 15 to 30 pounds of steam per pound of carbon, maintaining a temperature from 1000° F. to 1500° F. and low superatmospheric pressures in said conversion zone so that the carbon and steam react to form an effluent rich in hydrogen and carbon dioxide and containing less than 5 volume per cent carbon monoxide, scrubbing the said effluent to absorb said carbon dioxide, and recovering the hydrogen product.

3. The process according to claim 2 wherein the catalyst comprises alumina impregnated with minor proportions of at least one oxide selected from the groups consisting of the alkali metal and alkaline earth metal oxides.

4. A process according to claim 2 in which the superatmospheric pressures are from 25 to 100 pounds per square inch gage.

5. The process for the production of hydrogen by a catalytic cyclic method in which the catalyst composition is alternately utilized for carbonizing gaseous hydrocarbon in one stage and for promoting the interaction of the resulting carbon and steam-air mixtures to produce a gas rich in hydrogen in another stage, which comprises the steps, during the first stage, of preheating said hydrocarbon to a temperature from 900° to 1500° F., passing the heated hydrocarbon over said catalyst composition at a rate of 1 to 5 volumes of liquid feed to 1 volume of catalyst per hour so as to deposit between 0.05 and 0.3 pound of carbon per pound of catalyst thereon, maintaining a pressure from 25 to 100 pounds per square inch gage, recovering the resulting effluent, and which comprises the steps, during the second stage, of preheating steam containing sufficient air to supply the necessary heat of reaction in the second stage, passing said steam-air mixture over said catalyst in the amount of 15 to 30 pounds of steam per pound of carbon so that the steam and carbon deposited thereon interact to form a hydrogen and carbon dioxide effluent containing less than 5 volume per cent carbon monoxide, maintaining a temperature of conversion from 1000° F. to 1500° F. and a superatmospheric pressure from 25 to 100 pounds per square inch gage, scrubbing said hydrogen and carbon dioxide effluent to absorb the carbon dioxide and recovering substantially pure hydrogen gas.

6. The process of claim 5 wherein the catalyst composition comprises alumina impregnated with a minor proportion of at least one oxide selected from the group consisting of the alkali metal and alkaline earth metal oxides.

7. A process according to claim 5 wherein the quantity of air admixed with the steam is in the proportion of about 1.5–5 cubic feet per pound of steam.

8. A process for the manufacture of hydrogen which comprises contacting a hydrocarbon fluid with a contact material comprising alumina impregnated with a minor proportion of at least one oxide selected from the group consisting of the alkali metal and alkaline earth metal oxides at a temperature sufficient to effect conversion of said fluid to carbon and deposit on said contact material between 0.05 and 0.3 pound of carbon per pound of contact material, contacting said material containing carbon with a mixture of steam and air in the proportion of 15–30 pounds of steam per pound of carbon and containing between 1.5 and 4.5 cubic feet of air per pound of steam at a temperature between about 1300° F. and 1500° F., thereby converting said carbon to form a gaseous mixture comprising a major proportion of hydrogen and a minor proportion of $CO_2$ and less than 5 volume per cent CO, removing the $CO_2$ from said gaseous mixture, and recovering substantially pure hydrogen therefrom.

9. In a process for the conversion of hydrocarbons comprising a conversion stage in which the catalyst becomes contaminated with a deposit of carbon and a regeneration stage in which the deposit of carbon is removed therefrom, the improvement which comprises passing pre-heated hydrocarbon through the catalytic conversion zone during such conversion stage at a sufficiently slow rate to deposit between about 0.05 and 0.3 pound of carbon per pound of catalyst therein, recovering an effluent of conversion hydrocarbons therefrom, subsequently passing a steam and air mixture through the catalytic conversion zone during the regeneration stage in such a manner that the steam interacts with said deposit of carbon to form hydrogen and carbon dioxide while regenerating said catalyst, maintaining the temperature of reaction during the regeneration stage from about 1000 to about 1500° F. and a pressure between about 25 and about 100 pounds per square inch gage, said steam in said regeneration stage being present in an amount of about 15 to about 30 pounds of steam per pound of carbon converted and said air amounting to 1.5 to 4.5 cubic feet per pound of steam, correlating regeneration conditions so as to produce a hydrogen-carbon dioxide mixture containing less than 5 volume per cent CO, scrubbing the effluent therefrom to absorb said carbon dioxide, and recovering substantially pure hydrogen.

10. The process of claim 9 in which the catalyst comprises alumina impregnated with minor proportions of alkali and alkaline earth oxides.

11. The process of claim 5 in which said hydrogen and carbon dioxide effluent contains carbon dioxide in a ratio of at least about 10 volumes of carbon dioxide to one volume of carbon monoxide.

12. The process of claim 8 in which said hydrocarbon fluid comprises a gas oil having a gravity of about 33° API.

13. The method of producing hydrogen by a cyclic catalytic process comprising, in a first stage, contacting a catalyst effective in the conversion of hydrocarbons and in the reaction of carbon with steam with a gaseous stream of hydrocarbon at a temperature in the range of 900 to 1500° F. and a flow rate between 1 and 5 volumes of liquid feed per volume of catalyst per hour so as to deposit between 0.05 and 0.3 pound of carbon per pound of catalyst, recovering at least a portion of the effluent from the first stage; and, in a second stage, discontinuing the flow of hydrocarbon feed to said catalyst, thereafter contacting the carbon contaminated catalyst with a mixture of steam and oxygen at a temperature between 1000 and 1100° F. and in an amount between 15 and 30 pounds of steam per pound of carbon converted, maintaining an amount of air between 1.5 and 4.5 cubic feet per pound of steam in the mixture so as to supply exothermic heat sufficient to maintain reaction temperature between 1000 and 1500° F., the reaction conditions in the second stage being correlated so as to produce an effluent rich in hydrogen and having a ratio of $CO_2$ to CO of at least 10 to 1, and recovering hydrogen from said effluent.

14. The method of claim 13 in which the hydrocarbon conversion is effected in the range of 1100 to 1200° F. and the reaction in the second stage is effected in the range of 1300 to 1400° F.

15. The method of claim 13 in which the catalyst comprises alumina impregnated with a minor proportion of at least one oxide selected from the group consisting of the alkali metal and alkaline earth metal oxides.

16. A cyclic process for the conversion of hydrocarbons in a first stage and the production of hydrogen in a second stage, comprising passing a stream of vaporized hydrocarbon at a temperature between 1000 and 1500° F., a pressure of between 25 and 100 p. s. i. g., and a flow rate between 1 and 5 volumes of liquid feed per volume of catalyst per hour over a combination hydrocarbon conversion-water gas catalyst; correlating said conditions of temperature, pressure, and flow rate so as to favor the deposition of carbon on said catalyst and to effect conversion of said hydrocarbon; continuing said first stage until from 0.05 to 0.3 pound of carbon per pound of catalyst is deposited thereon; recovering a conversion product from said first stage; thereafter, in a second stage, passing a mixture of steam and air at an elevated temperature in proportions of from 1.5 to 4.5 cubic feet of air per pound of steam and at least 15 pounds of steam per pound of carbon converted into contact with the carbon contaminated catalyst so as to maintain a reaction temperature in said second stage between 1300 and 1400° F. and produce a hydrogen-rich effluent having a ratio of $CO_2$ to CO of at least 10 to 1; and recovering hydrogen from said effluent.

CARL J. HELMERS.
PAUL H. JOHNSON.

REFERENCES CITED

The following references are of record in the file of this patent:

UNITED STATES PATENTS

| Number | Name | Date |
|---|---|---|
| 1,832,217 | Joseph | Nov. 17, 1931 |
| 2,071,286 | Johnson et al. | Feb. 16, 1937 |
| 2,133,496 | Winkler | Oct. 18, 1938 |
| 2,172,534 | Grosse | Sept. 12, 1939 |
| 2,270,715 | Layng et al. | Jan. 20, 1942 |
| 2,284,603 | Belchetz et al. | May 26, 1942 |
| 2,320,118 | Blaker | May 25, 1943 |
| 2,353,508 | Schulze | July 11, 1944 |

OTHER REFERENCES

Gas Journal, vol. 178, page 898 (1927).